2 Sheets—Sheet 1.

T. & I. W. WARD.

HARVESTER.

No. 7,158. Reissued June 6, 1876.

Witnesses
A. P. Lacey
R. S. Lacey

Inventor
Thos. Ward
Israel W. Ward
By G. B. Towles
Attorney.

N. PETERS, PHOTO-LITHOGRAPHER, WASHINGTON, D. C.

T. & I. W. WARD.

HARVESTER.

No. 7,158. Reissued June 6, 1876.

Witnesses
A. P. Lacey
R. S. Lacey.

Inventor
Thos Ward
Israel W. Ward
By G. B. Towles
Attorney.

N. PETERS, PHOTO-LITHOGRAPHER, WASHINGTON, D. C.

UNITED STATES PATENT OFFICE.

THOMAS WARD, OF ROCHELLE, ILLINOIS, AND ISRAEL W. WARD, OF NEWARK, NEW JERSEY, ASSIGNORS TO CHARLES DENTON.

IMPROVEMENT IN HARVESTERS.

Specification forming part of Letters Patent No. 39,186, dated July 7, 1863; reissue No. 7,158, dated June 6, 1876; application filed March 7, 1876.

*To all whom it may concern:*

Be it known that we, THOMAS WARD, now of Rochelle, Ogle county, in the State of Illinois, and ISRAEL W. WARD, now of Newark, Essex county, in the State of New Jersey, (both formerly of Lane Station, Ogle county, Illinois,) have invented certain new and useful Improvements in Harvesters; and we do hereby declare that the following is a full, clear, and exact description thereof, that will enable others skilled in the art to which it appertains to make and use the same, reference being had to the accompanying drawings, and to the letters of reference marked thereon, forming a part of this specification.

Figure 1:
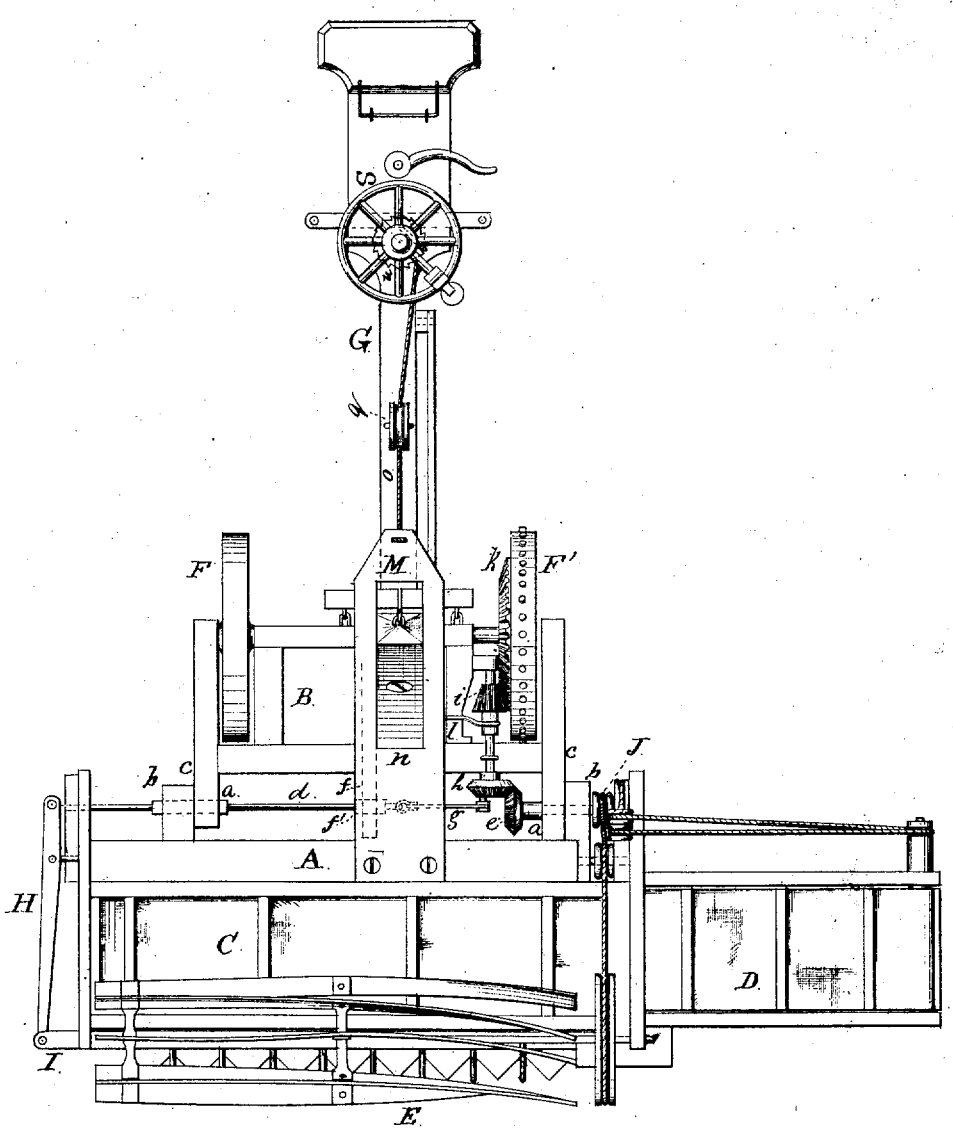
Figure 2:
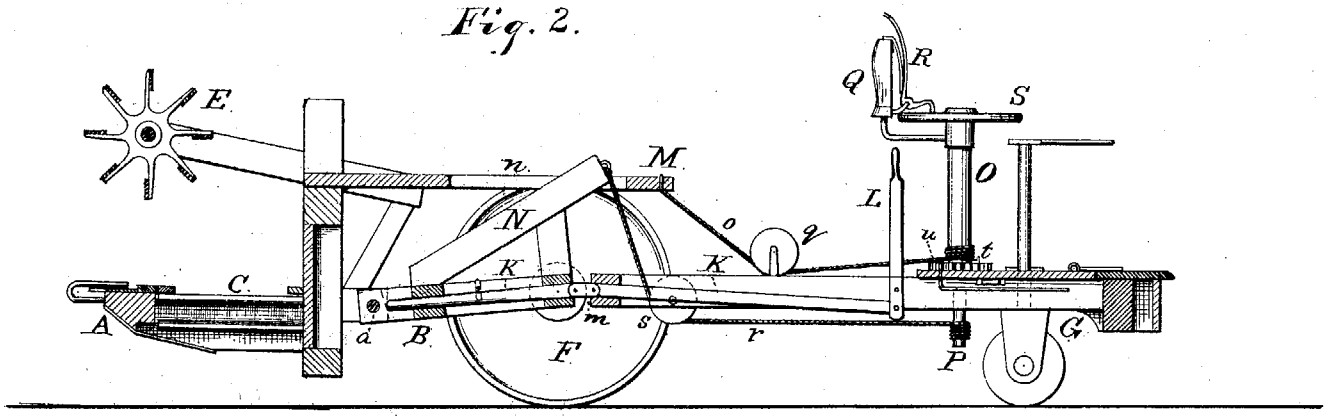

Figure 1 is a plan view of our improved harvester; Fig. 2, a longitudinal section of the same, as indicated by the line *x x* of Fig. 1.

Like letters in both figures of the drawings indicate like parts.

This invention relates to the class of harvesters known as "headers," and its object is to adjust the cutter-platform in a horizontal position to cut prostrate grain, and so as not to tilt the carrier on one side, and thus spill the grain; and it consists in the combination of the cutter and grain platform, having a hinged connection in its rear to the tilting wheel-frame, and gearing for operating the knives, as will be hereinafter more fully explained.

A is the cutter-platform; B, the wheel-frame; C, the endless apron; D, the carrier; E, the reel; F F′, the wheels, one of which, F′, is the driving-wheel; and G, the tongue or pole, provided with the usual tiller-wheel.

The platform is connected to the wheel-frame by means of tubes *a a*, which pass through their respective cross-beams *b c*, and thus form pivot-pins for the platform to hinge or turn upon, and also form bearings for the rod or pitman *d*, and for the shaft of the bevel-gear wheel *e*, the rod and shaft passing through the tubes, the inner end of the rod having its bearing in an additional tube, *f′*, supported by an arm, *f*, (shown in dotted lines,) attached to the frame B. The inner end of the rod is pivoted to a crank-arm, *g*, having a pivotal connection with a crank-pin attached eccentrically to the bevel-gear wheel *h*, the shaft of which is provided at its opposite end with another bevel-gear wheel, *i*, which is made to gear with the bevel-gear wheel *k* on the driving-wheel F′. The outer end of the rod is pivoted to the end of lever H, which has its fulcrum on the end of the platform, and which is pivoted, at its opposite end, to the end of the operating-bar I of the sickle. Thus, through the lever and rod connecting with the crank-pin of the bevel-gear wheel *h*, in the manner described, a reciprocating motion is imparted to the sickle. The bevel-gear wheel *e* gears with wheel *h*, and its shaft is provided, on its opposite end, with a pulley, J, by means of which motion is transmitted to the reel, apron, and carrier, in the usual manner, which are all operated simultaneously with the sickle. The bevel-gear wheel *i* is thrown in and out of gear with the wheel *k* by means of a shipper, *l*, which is connected to the hub of the wheel *i*, and is attached to a rod constructed in two parts, K K, which are connected by a link-joint, *m*, (see Fig. 2,) in order to admit of the frame B being raised and lowered, the rod passing through the frame B, and arranged so that it may slide therein, so as to move the shipper *l*, and consequently the wheel *i*, to throw it in and out of gear with wheel *k*, as above described. The rod is operated by means of the lever L, having its fulcrum on the side of the tongue F. (See Fig. 2.) An arm, M, is attached to the back part of the platform A, and provided with a slot, *n*, to allow the arm N, attached to the frame B, to pass or work through the same when adjusting the platform. A cord, *o*, is attached to the end of arm M, which passes under a pulley, *q*, on the tongue F, and connects with the tube O, which is supported by the shaft P, passing up through it and the tongue. A cord, *r*, is attached to the end of arm N, which passes through the tongue F and under a pulley, *s*, therein, and connects with the lower end of the shaft P under the tongue. (See Fig. 2.) A pawl, *t*, attached to the tongue F, is arranged to engage with a ratchet, *u*, on the shaft and at the base of the tube. The upper end of the tube O is provided with a crank, Q, having a catch, R, attached to it, which engages with a hand-wheel, S, on the top of the shaft. The cord *r* is wound upon the shaft in a direction opposite to that in which the cord *o* is wound on the tube O.

The operation is as follows: The front end of the wheel-frame B, next to the cutting-platform A, is tilted or let down by turning the shaft P and tube O in opposite directions, so that the cutting-platform can be adjusted and kept in a horizontal position, so as not to tilt the carrier or elevating part of the apron, and thus spill the grain, and while in that position can be lowered close enough to the ground to cut prostrate grain. This adjustment may be made while the machine is in motion, owing to the cutting-platform being hinged to the wheel-frame in such manner that the sickle-driving mechanism will adapt itself to any required adjustment of the cutting-platform and wheel-frame. The shaft P is retained in position by the ratchet and pawl, and the tube O by the catch R on the crank Q.

Having thus fully described our invention, what we claim therein as new, and desire to secure by Letters Patent, is—

1. The combination, in a header, of a cutter and grain platform, having a hinged connection in its rear to the wheel-frame, and gearing for operating the knives, constructed to permit the cutter-platform to be adjusted in a horizontal position to cut prostrate grain, and so as not to tilt the carrier on one side and spill the grain, substantially as and for the purposes set forth.

2. In a harvester having the cutter-platform and wheel-frame connected by a hinge-joint, the bevel-gear wheels *e*, *h*, *i*, and *k*, rod or pitman *d*, tubes *b*, *c*, and *f*, and lever H, constructed to operate the knives, reel, apron, and carrier, substantially as set forth.

3. The tubes forming pivot-pins for the hinge-joint, in combination with the rod or pitman *d* and shaft of bevel-gear wheel *e*, substantially as set forth.

4. The rod constructed in two parts, and connected by a link-joint, *m*, in combination with shipper *l*, connected with the hub of wheel *i*, lever L, having its fulcrum on the tongue F, and the hinged frames, substantially as and for the purpose set forth.

5. The combination of the arms M N, attached, respectively, to the cutter-platform and wheel-frame, ropes *o r*, pulleys *q s*, shaft P, tube O, ratchet *u*, pawl *t*, crank Q, catch R, and hand-wheel S, substantially as and for the purposes set forth.

In testimony that we claim the foregoing we have hereunto set our hands this 23d day of December, 1875.

THOMAS WARD.
ISRAEL W. WARD.

Witnesses:
H. O. ROGERS,
F. J. MURRAY.